Jan. 30, 1923.
V. A. FYNN.
ROLLER BEARING.
FILED JUNE 28, 1917.
1,443,915.
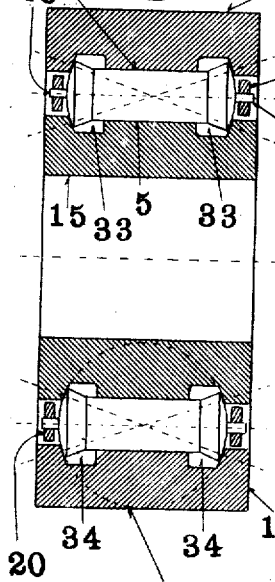
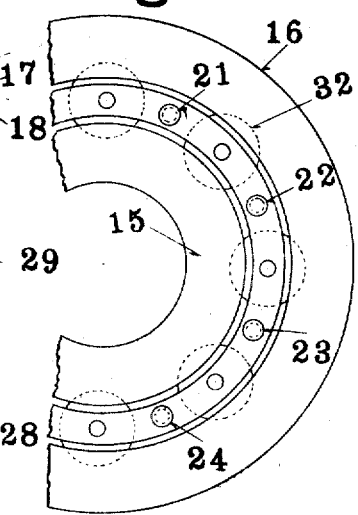
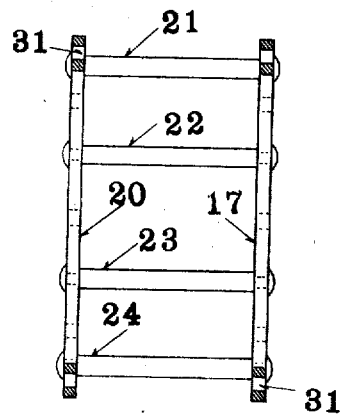
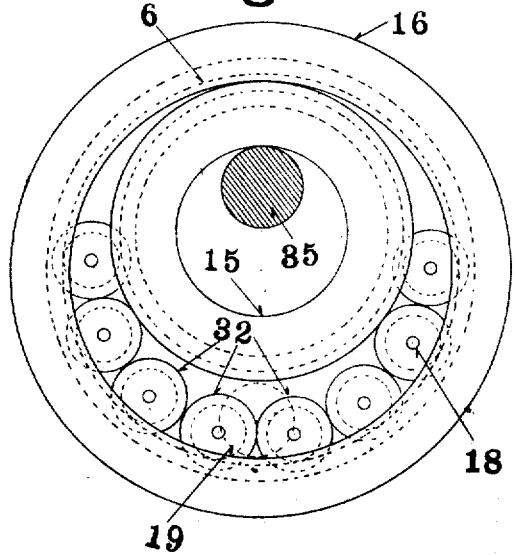
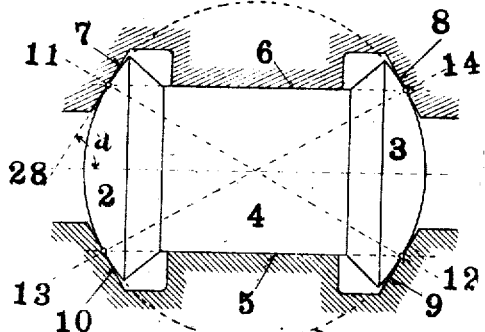
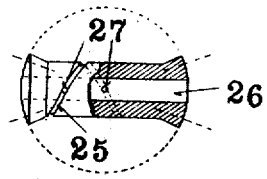
WITNESS
W. A. Alexander
INVENTOR.
Valère A. Fynn
BY E. E. Huffman
ATTORNEY.

Patented Jan. 30, 1923.

1,443,915

UNITED STATES PATENT OFFICE.

VALÈRE A. FYNN, OF ST. LOUIS, MISSOURI, ASSIGNOR, BY MESNE ASSIGNMENTS, TO WAGNER ELECTRIC CORPORATION, OF ST. LOUIS, MISSOURI, A CORPORATION OF DELAWARE.

ROLLER BEARING.

Application filed June 28, 1917. Serial No. 177,453.

*To all whom it may concern:*

Be it known that I, VALÈRE A. FYNN, a subject of the King of England, residing at the city of St. Louis, State of Missouri, United States of America, have invented a certain new and useful Roller Bearing, of which the following is such a full, clear, and exact description as will enable any one skilled in the art to which it appertains to make and use the same, reference being had to the accompanying drawings, forming part of this specification.

My invention relates to roller bearings, and its object is to provide a bearing capable of taking care of axial loads as well as of radial loads while avoiding all but true rolling motions between the various co-operating surfaces.

In carrying out my invention I make each roller in the shape of a double-headed rivet having a cylindrical center portion and enlarged ends having spherical outer surfaces, and provide each race with three working surfaces—one cylindrical surface to co-operate with the middle part of the roller and two conical surfaces to co-operate with the spherical ends of the roller, taking care to arrange for the conical working surfaces of the races to contact with the spherical ends of the roller at a point in alinement with the surface of the cylindrical portion of the roller.

Referring to the accompanying drawings, which illustrate my invention, Figure 1 is a cross section of the improved bearing; Fig. 2, an end view thereof; Fig. 3, a cross section of the cage; Fig. 4, an end view of the bearing showing the method of assembling; Fig. 5, an enlarged view of one of the improved rollers, and Fig. 6 is a view, partly in section of a modified form of roller.

Each roller 32 has a cylindrical body 4 and heads 2, 3 having spherical outer surfaces. The cross section of the inner as well as of the outer race is, roughly, E-shaped. The central portion 5 of the inner race and the central portion 6 of the outer race, each form a working surface concentric with the bearing axis 29 and adapted to co-operate with the cylindrical portion 4 of the roller. The inner race has in addition to the surface 5, two working surfaces 9, 10, inclined with respect to 5 and separated therefrom by the grooves 33, and adapted to contact with the spherical roller heads 2, 3 at points in alinement with the surface of the cylindrical portion 4 of the roller. The outer race has two similar working or bearing surfaces 7, 8, separated from the cylindrical bearing surface 6 by grooves 34 and adapted to contact with the spherical ends of the rollers 32 at points in alinement with the surface of the cylindrical portion 4 of the roller. In Figs. 1, 2 and 4, each roller is provided with the pins 18, located axially and projecting beyond its spherical heads. Located at each end of the rollers and between the lips of the inner and outer races are spacing rings 17, 20, provided with holes 31 into which the pins 18 are loosely fitted. The two rings 17, 20 are kept at a fixed distance from each other by spacing rods 21, 22, 23, 24, and this whole structure thus forms a cage which serves to properly space the rollers 32.

In order to assemble the bearing shown in Figs. 1 and 2, the inner race 15 may be placed on a rod 35 and the outer race 16 may be hung over it, as shown in Fig. 4, leaving a crescent-like space between the two races. One roller after another is then introduced between the races, for instance at the point indicated by the dotted circle 19; dropped into contact with the bearing surface 6 of the outer race, and pushed to the left or right to make room for the next roller, and so on.

In order to improve the lubrication of the cylindrical surfaces and to facilitate the elimination of grit and the like, which may find its way into the bearing, a spiral groove 25 may be cut into the cylindrical body 4 of each roller, as shown in Fig. 6. Instead of providing each roller with pins 18, it may be made hollow. When such a hollow roller is provided with an oiling groove 25, then little holes 27 can be drilled through the body of the roller, so as to place the groove and the inner hole 26 of the roller into communication, thus again improving lubrication. In case hollow rollers are used, the holes 31 in the sides 17, 20 of the cage can be omitted and the spacing rods 21, 22, 23, 24 also used to guide the rollers by passing them through the central openings 26 thereof.

I prefer to so design each roller that the surfaces of its ends 2, 3 form parts of the surface of a single sphere, indicated in Fig.

5 by the dotted circle 30. In such case the point of contact between the head 3 and the working surface 8, and the point of contact between the head 2 and the working surface 10, will be at either end of a diameter of the sphere 30, as clearly shown in Fig. 5. Under these conditions that component of the axial load which is perpendicular to the tangent at the point of contact between a spherical head and a conical race is transmitted through the center of the roller (the center of the sphere 30 of which it is a part) and does not produce any canting of the roller. Similarly the line connecting the point of contact between the head 3 and the bearing surface 9, with the point of contact between the head 2 and the bearing surface 7, and passing through the center of the roller, will be perpendicular to the tangents at the points of contact.

The rollers shown can only rotate about their axes 28 and revolve around the axis 29 of the bearing. Whatever the speed at which these rollers rotate, the difference in speed between the cylindrical portion 4 of each roller and the bearing surface 6 will be exactly the same as the difference in speed between the head 3 and the bearing surface 8, or the head 2 and the bearing surface 7. Similarly the difference in speed between the head 3 and the working surface 9, and the head 2 and the working surface 10 will always be exactly the same as the difference in speed between the cylindrical body 4 and the bearing surface 5. Any radial load which this improved bearing may have to carry will be taken care of by the bearing surfaces 5, 6 and the cylindrical part 4 of those rollers which are carrying the load. Any axial load directed from right to left will be taken care of along the axis 13, 14 between the head 3 and the bearing surface 8 at one end and between the head 2 and the bearing surface 10 at the other end. An axial load directed from left to right will be taken care of along the axis 11, 12 between the bearing surface 7 and the head 2 at one end and the bearing surface 9 and the head 3 at the other.

In practice it will be permissible to allow a slight end play between the rollers and each of the races. Furthermore, it will not be necessary to make the inclined bearing surfaces 7, 8, 9, 10 exactly conical. Each of these surfaces may be given a slight curvature, thus introducing a little friction as in ball bearings, but increasing somewhat the axial load capacity of the bearing. It is known from ball bearing practice that such an expedient, if not pushed too far, does more good than harm.

While I prefer to so dimension each roller that its two heads form part of a single sphere, yet this is not a necessary condition. The cylindrical part of the roller shown in Fig. 5, for instance, may be either lengthened or shortened, but it is necessary that the center of the sphere of which a head forms a part be located on the axis 28 of the roller.

If the diameter of the cylindrical part 4 of the roller is $2r$, and the angle between that working surface (7, 8, 9 or 10) which takes the axial thrust and the axis of the roller 28, is $a$, and the radius of the sphere of which the roller-head thrust-taking surface (2 or 3) must be a part is $x$, then the proper relation between these factors is given by the expression $$x = \frac{r}{\sin(90-a)}$$

This relation holds good in case the two heads of the roller form part of different spheres or part of one and the same sphere, and ensures an actual rolling between the roller and those race surfaces which take radial, as well as between the roller and those race surfaces which take axial loads. This relation provides for inclined axial load bearing surfaces tangential to the spherical ends of the roller at the theoretically correct point of contact situated at the distance $r$ from the roller axis 28.

In case the bearing is to take axial loads in one direction only the construction may be cheapened by omitting a part of each of the races. Thus if the bearing shown in Fig. 1 is to take radial loads, and axial loads directed from right to left but no axial loads in an opposite direction, then the conical surfaces 7 and 9 and all the left end of the outer and the right end of the inner race can be omitted.

Having fully described my invention, what I claim as new and desire to secure by Letters Patent of the United States is:

1. A roller bearing comprising inner and outer race members and a plurality of rollers between said members, each roller having a cylindrical central portion and having each of its ends provided with a spherical surface, each race being provided with thrust bearing surfaces positioned to contact with each end of each roller and at points in line with the periphery of the central portion of said roller.

2. A roller bearing comprising a plurality of rollers each having a cylindrical central bearing portion and having the surfaces of its ends so shaped that each forms part of a spherical surface whose center lies in the axis of the roller, and inner and outer race members each provided with bearing surfaces to co-operate with both end portions and with the central portion of each roller.

3. A roller bearnig comprising a plurality of rollers each having a cylindrical central bearing portion and having the surfaces of its ends so shaped that both form parts of the surface of a single sphere, and inner and outer race members each provided with surfaces to co-operate with both end portions and the central portion of each roller, the surfaces cooperating with the ends of the rollers being positioned to contact therewith at points in line with the peripheries of the central portions of the rollers.

4. A roller bearing for axial and radial loads comprising a plurality of rollers each having a cylindrical central bearing portion and integral enlargements at each end each forming a bearing surface, inner and outer race members each provided with bearing surfaces to co-operate with each bearing surface of the rollers and positioned to cause all points of contact of each race with a roller to be in a single line.

5. A roller bearing comprising a plurality of rollers each having a central cylindrical bearing portion and enlargements at each end to form thrust bearing surfaces, outer and inner race members each having bearing surfaces to co-operate with the central surface of each roller, the outer race member also having a thrust bearing surface to contact with one end of each roller and the inner race member a thrust bearing surface to contact with the opposite end of each roller, the respective bearing surfaces of the races being positioned to cause all points of contact of a race member with a roller to be in a single line.

In testimony whereof, I have hereunto set my hand and affixed my seal.

VALÈRE A. FYNN. [L. S.]